(12) United States Patent
Lutz et al.

(10) Patent No.: US 11,466,880 B2
(45) Date of Patent: Oct. 11, 2022

(54) ENVIRONMENTAL CONTROL SYSTEM

(71) Applicant: Safe Air Corp., Sarasota, FL (US)

(72) Inventors: Wayne Lutz, Manasquan, NJ (US); Donald Lavrenz, Jr., Waukesha, WI (US)

(*) Notice: Subject to any disclaimer, the term of this patent is extended or adjusted under 35 U.S.C. 154(b) by 403 days.

(21) Appl. No.: 16/560,601

(22) Filed: Sep. 4, 2019

(65) Prior Publication Data

US 2020/0003439 A1 Jan. 2, 2020

Related U.S. Application Data

(62) Division of application No. 15/217,692, filed on Jul. 22, 2016, now Pat. No. 10,451,301.

(51) Int. Cl.
*F24F 11/00* (2018.01)
*F24F 11/30* (2018.01)
(Continued)

(52) U.S. Cl.
CPC ............ *F24F 11/30* (2018.01); *B60Q 9/00* (2013.01); *F24F 11/62* (2018.01); *F24F 11/77* (2018.01);
(Continued)

(58) Field of Classification Search
CPC . F24F 11/30; F24F 11/62; F24F 11/77; B60Q 9/00
See application file for complete search history.

(56) References Cited

U.S. PATENT DOCUMENTS 4,234,926 A * 11/1980 Wallace ............... G01D 9/005
700/80
8,639,391 B1 * 1/2014 Alberth, Jr. ............ G05B 15/02
340/657
(Continued)

FOREIGN PATENT DOCUMENTS

AU 2006255054 A1 * 12/2007 ......... G06K 19/0707
WO 2013037830 A1 3/2013
(Continued)

OTHER PUBLICATIONS

4-Channel RF Receiver, 315MHz, 11-24 VAC/VDC, Up to 500ft (152m) range; http://www.seco-larm.com/SK-910R4Q; printed Oct. 12, 2016.
(Continued)

*Primary Examiner* — Laura M Menz
(74) *Attorney, Agent, or Firm* — Lerner, David, Littenberg, Krumholz & Mentlik, LLP

(57) ABSTRACT

An environmental control system includes a transmitting device for signaling to a receiver to activate an environmental control unit (ECU). The transmitting device includes a connector for removably installing and connecting to electrical power in the vehicle and a transmitter for transmitting a signal to a remote receiver. The ECU comprises of an exterior control panel and microprocessor-based controller for operating environmental devices within a facility or other defined space. When the controller receives an input from any of the receiver and an external environmental device, it activates at least one of the environmental devices. When the controller receives any such input that is outside a predefined range, the controller generates any of a visual or audible alarm and notifies a predetermined recipient.

20 Claims, 11 Drawing Sheets

(51) Int. Cl.

| | |
|---|---|
| *B60Q 9/00* | (2006.01) |
| *G05B 15/02* | (2006.01) |
| *F24F 11/77* | (2018.01) |
| *F24F 11/62* | (2018.01) |
| *H04B 1/3822* | (2015.01) |
| *F24F 11/56* | (2018.01) |
| *F24F 11/39* | (2018.01) |
| *F24F 11/61* | (2018.01) |
| *F24F 110/10* | (2018.01) |
| *F24F 11/33* | (2018.01) |
| *F24F 110/40* | (2018.01) |
| *F24F 110/64* | (2018.01) |
| *G08C 17/02* | (2006.01) |

(52) U.S. Cl.
CPC ............ *G05B 15/02* (2013.01); *H04B 1/3822* (2013.01); *F24F 11/33* (2018.01); *F24F 11/39* (2018.01); *F24F 11/56* (2018.01); *F24F 11/61* (2018.01); *F24F 2110/10* (2018.01); *F24F 2110/40* (2018.01); *F24F 2110/64* (2018.01); *G08C 17/02* (2013.01)

(56) References Cited

U.S. PATENT DOCUMENTS

| | | | | |
|---|---|---|---|---|
| 10,408,482 | B2* | 9/2019 | Ro | F24F 11/62 |
| 10,451,301 | B2* | 10/2019 | Lutz | F24F 11/30 |
| 10,495,541 | B2* | 12/2019 | Aliyu | G01M 3/04 |
| 11,246,187 | B2* | 2/2022 | McCracken | G08B 25/10 |
| 2003/0090374 | A1* | 5/2003 | Quigley | G08B 21/24 |
| | | | | 340/506 |
| 2009/0102296 | A1* | 4/2009 | Greene | H01Q 1/243 |
| | | | | 307/149 |
| 2012/0080944 | A1* | 4/2012 | Recker | H05B 47/16 |
| | | | | 307/25 |
| 2014/0208840 | A1* | 7/2014 | Bright | G01N 33/0006 |
| | | | | 73/152.19 |
| 2017/0061784 | A1* | 3/2017 | Clough | G06F 3/04842 |
| 2017/0223807 | A1* | 8/2017 | Recker | H05B 47/115 |
| 2018/0023828 | A1* | 1/2018 | Lutz | H04B 1/3822 |
| | | | | 700/276 |
| 2019/0098721 | A1* | 3/2019 | Udavant | H05B 45/20 |
| 2019/0226595 | A1* | 7/2019 | Mattos | F17C 13/12 |
| 2020/0003439 | A1* | 1/2020 | Lutz | F24F 11/77 |
| 2020/0383172 | A1* | 12/2020 | McCracken | H04W 88/06 |

FOREIGN PATENT DOCUMENTS

| | | | | |
|---|---|---|---|---|
| WO | WO-2013037830 | A1 * | 3/2013 | ......... A61B 18/1206 |
| WO | WO-2018048517 | A1 * | 3/2018 | ............. G01N 27/16 |

OTHER PUBLICATIONS 50 mm Tower Lights: TL50 Series; https://www.bannerengineering.com/us/en/products/lighting-and-indicators/tower-lights/50mm-tower-lights-tl50-series.html; printed Oct. 12, 2016.

Dual Car Charger with Lightning to USB Cable; http://www.belkin.com/us/p/P-F8J071/; printed Oct. 12, 2016.

Easton/Cutler Hammer C0100E1B MTE Industrial Control Transforme 120/240 Volt Primary, 24 Volt Secondary, 100 VA, 1 Phase; http://www.cesco.com/b2c/product/Eaton-Cutler-Hammer-C0100E1B-MTE-Industrial/591273; printed Oct. 12, 2016.

Enercell remote control unit battery—23A—alkaline x 2; http://www.cnet.com/products/enercell-remote-control-unit-battery-23a-alkaline-x-2/specs/; printed Oct. 12, 2016.

Extended Range Antenna; http://www.seco-larm.com/SK-91ERSD; printed Oct. 12, 2016.

External gas detection system Honeywell E3Point Gas Monitor; http://www.honeywellanalytics.com/en/products/E3Point; printed Oct. 12, 2016.

Kussmaul Electronics, RF Transmitter & Receiver Model #091-133.

Panel Mount Signaling Alarms ; http://ab.rockwellautomation.com/Signaling-Devices/Panel-Mount-Signaling-Alarms#overview; printed Oct. 12, 2016.

Pre-Wired, 1-Button, 1-Channel, Fixed Code Transmitter, Uncoded; http://www.seco-larm.com/SK-919TDWS-BU; printed Oct. 12, 2016.

Sensaphone Web600 Monitoring System; http://www.sensaphone.com/products/sensaphone-web600-monitoring-system.php; printed Oct. 12, 2016.

Terminal blocks Allen Bradley Model No. 1492-J3; http://raise.rockwellautomation.com/RAConfig/resultsComponents.asp?CID=42C991F666774A80BF681DEEFEA473CF; Printed Oct. 27, 2016.

\* cited by examiner

ENVIRONMENTAL CONTROL SYSTEM

CROSS-REFERENCE TO RELATED APPLICATION

The present application is a divisional of U.S. patent application Ser. No. 15/217,692 filed Jul. 22, 2016, the disclosure of which is hereby incorporated herein by reference.

BACKGROUND OF THE TECHNOLOGY

Diesel engine exhaust is carcinogenic to humans. According to a study conducted by the International Agency for Research on Cancer (IARC), there is sufficient evidence that exposure to diesel engine exhaust is associated with an increased risk for lung cancer. Accordingly, firetrucks and other vehicles that operate using diesel engines pose a significant threat to operators and workers who work in facilities where such vehicles are kept.

Facilities housing these vehicles commonly have a number of fans, which may be blowers, which are used to remove exhaust gases as well as to circulate and cool the air in the facilities. Some of these facilities are equipped with receivers that communicate with transmitters placed in the vehicles to control the fans, to open and close garage doors, to operate traffic lights, and to control lighting in the facility. The transmitters send signals to the receiver by way of any number of a plurality of channels, some of which could be made proprietary by coding the transmitter and the receiver. Some of these channels transmit signals automatically while others transmit signals through buttons on the transmitter in which such signals are received by the receiver when in range. Once the signals are received, the receiver actuates a controller for the fans in the facility as well as other associated devices. However, the remote control systems currently in use are hardwired to the vehicles which prevent them from being easily portable from vehicle to vehicle. Also, such systems can only handle a limited number of vehicles and operate over a limited range. They also do not take any active steps to conserve power, to mitigate emergencies or to monitor maintenance and service needs.

Therefore, there is a need for an environmental control system that provides a more portable transmission device, can handle an unlimited number of vehicles, can be controlled from a greater distance from the facility, can provide maintenance and emergency management while actively conserving power. Further, there is a need for such a system that provides more active controls of environmental parameters.

BRIEF SUMMARY OF THE INVENTION

In one aspect of the technology, a transmitting device for installation in a vehicle and for signaling a receiver to activate an environmental control unit may include a housing, an electrical circuit within the housing and a connector. The electrical circuit may include a transmitter that may be configured for transmitting a signal that may be received by a receiver. The receiver may be located at a distance greater than 150 feet from the transmitter. The signal, which may be but is not limited to being a radiofrequency signal, when received by the receiver, may initiate the operation of an environmental control unit. The connector may be electrically connected on a first end of the connector to the electrical circuit. The connector may have an electrically conductive pin-type plug or socket on a second end of the connector opposite to the first end. The electrically conductive pin-type plug or socket may be exposable by the housing for removable installation and for electrical connection of the plug or socket in a passenger compartment of a vehicle. Such electrical connection may be a key switchable electrical connection to the vehicle.

In some arrangements, the electrical circuit within the transmitting device may include a processor, which may be but is not limited to being a microprocessor. The processor may be configured to provide a dual timer function. In those arrangements, the dual timer function may include a first timer that may be configured for turning on a preselected signal output for a first interval of time and a second timer that may be configured for turning off the preselected signal output after a second interval of time. In some arrangements, the microprocessor may act as a dual timer by executing a set of pre-programmed instructions.

In some arrangements, the transmitting device may include at least one fuse between the electrical circuit and the connector. In this manner, the fuse may protect at least the electrical circuit from a power surge.

In some arrangements, the transmitting device may include a button to disconnect the transmitting device from the receiver at least when the transmitting device is electrically powered by the vehicle.

In some arrangements, the transmitting device may include a first light indicator that may indicate when power is being supplied to the transmitting device and a second light indicator that may indicate when the signal is being sent.

In some arrangements, the electrically conductive pin-type plug or socket may be a respective universal serial bus (USB) plug or socket and the transmitting device may include a lighter plug adapter. In those arrangements, the lighter plug adapter may have a plug or socket on one end that may be configured for receiving the respective universal serial bus (USB) plug or socket, and a lighter plug on the opposite end that may be configured for receipt by a corresponding lighter socket in the vehicle.

In some other arrangements, the electrically conductive pin-type plug or socket of the transmitting device may be a lighter plug. In those arrangements, the transmitting device may include a second connector electrically connected to the electrical circuit on one end of the connector and a USB plug or socket on the opposite end. In those arrangements, the USB plug or socket may be exposable by the housing of the transmitting device for removable installation and for electrical connection of the plug or socket in a passenger compartment of a vehicle for key switchable electrical connection to the vehicle.

In some arrangements, the transmitter of the transmitting device may be configured for transmitting a signal receivable by the receiver when the receiver is located at most 1100 feet away from the transmitter.

In another aspect of the technology, a transmission system for activating an environmental control unit may include a transmitting device for installation in a vehicle and for signaling a receiver to activate the environmental control unit and a receiver for receiving the signal from the transmitting device. The transmitting device may include a housing, an electrical circuit within the housing and a connector. The electrical circuit may include a transmitter that may be configured for transmitting a signal that may be received by a receiver. The receiver may be located at a distance greater than 150 feet from the transmitter. The signal, which may be but is not limited to being a radiofrequency signal, when received by the receiver, may initiate the operation of an environmental control unit. The connector may be electrically connected on a first end of the connector to the electrical circuit. The connector may have an electrically conductive pin-type plug or socket on a second end of the connector opposite to the first end. The electrically conductive pin-type plug or socket may be exposable by the housing for removable installation and for electrical connection of the plug or socket in a passenger compartment of a vehicle. Such electrical connection may be a key switchable electrical connection to the vehicle.

In some arrangements, the receiver may include an exposed antenna dimensioned for receiving the signal from the transmitting device.

In some arrangements, the transmission system may include a microprocessor electrically connected to the receiver. In those arrangements, the microprocessor may be configured for receiving input from the receiver and directing the operation of environmental devices.

In some arrangements of the transmission system, the connector of the transmitting device may be removably installed in the vehicle by way of an interference fit.

In another aspect of the technology, a controller for controlling environmental devices to regulate environmental parameters within a defined space may include a microprocessor, a plurality of variable resistors electrically interfacing with the microprocessor and a plurality of timers electrically interfacing with the microprocessor. The microprocessor may be configured for operating the environmental devices upon receipt of any of an input from a receiver and a signal from a sensor. The plurality of variable resistors may be configured for adjusting the time-period of function of at least one of the environmental devices. The plurality of timers may be configured for logging and sending the microprocessor the runtime of at least one of the environmental devices. In some arrangements, when the runtime of any environmental device is outside a predefined range, the microprocessor may direct the environmental device outside its predefined range to alter its current configuration. In some arrangements, the environmental devices may include any of an exhaust fan, a general ventilation fan, and an air cleaning device.

In some arrangements, the controller may include at least one gas monitoring device electrically interfacing with the microprocessor. The gas monitoring device may be configured for receiving electrical signals corresponding to a concentration of a specified gas from gas sensors located remotely from the controller to determine a specified gas concentration. In some arrangements, when the specified gas concentration is determined by the microprocessor to be outside a predefined range, the controller may activate at least one of the environmental devices. When the concentration of the specified gas exceeds the predefined range, the controller may activate at least one of (a) a visual alarm and (b) an audible alarm.

In some arrangements, the controller may include a temperature sensor electrically interfacing with the microprocessor. The temperature sensor may be configured for detecting temperature within the defined space. When the temperature in the defined space is determined by the microprocessor to be outside a predefined range, the controller may activate one of the environmental devices.

In some arrangements, the controller may include a pressure differential switch electrically interfacing with the microprocessor. The switch may be configured for receiving electrical signals corresponding to static pressure measured in the air cleaning device to determine the cleanliness of a filter of the air cleaning device. When the cleanliness of the filter is determined by the microprocessor to be outside a predefined range, the controller may direct a change of status of a status indicator. In those arrangements, the status indicator is a light such that when the cleanliness of the filter of the air cleaning device is determined by the microprocessor to be outside the predefined range, the controller may direct the light to be illuminated.

In some arrangements, the controller may include a smoke detector electrically interfacing with the microprocessor. The smoke detector may be configured for detecting a concentration of smoke in the air of the defined space. When smoke is detected in the defined space, the controller may de-energize and shut down all of the environmental devices.

In some arrangements, the controller may further include a display that may be configured for indicating any of an operational status of each environmental device, a runtime of each environmental device, and environmental status information of each environmental device. In some arrangements, the display may be configured for indicating the temperature of exhaust gases in at least a portion of the defined space.

In some arrangements, the controller may include a battery backup electrically interfacing with the microprocessor. The battery backup may be configured for providing electrical power to the microprocessor in the event of a loss of utility-sourced power.

In another aspect of the technology, an environmental control unit may include a receiver that may be configured to receive a signal from a transmitting device and a controller for controlling environmental devices to regulate environmental parameters within a defined space. The controller may include a microprocessor, a plurality of variable resistors electrically interfacing with the microprocessor and a plurality of timers electrically interfacing with the microprocessor. The microprocessor may be configured for operating the environmental devices upon receipt of any of an input from a receiver and a signal from a sensor. The plurality of variable resistors may be configured for adjusting the time-period of function of at least one of the environmental devices. The plurality of timers may be configured for logging and sending the microprocessor the runtime of at least one of the environmental devices. When the receiver receives a signal from the transmitting device, the controller may automatically activate any one of the environmental devices controlled by the controller.

In some arrangements, the environmental control unit may include a notification device, which may be a message system, electrically interfacing with the controller. When the controller determines that environmental parameters are outside a predefined range, the controller may direct the notification device to send messages to at least one predetermined recipient. In some of those arrangements, the environmental parameters may include at least one of a power level of any one of the environmental devices, gas concentration, particle concentration, smoke presence, and gas temperature. In some of those arrangements, the environmental control unit may further include an uninterruptible power supply (UPS). In this manner, the notification device may receive electrical power from the UPS upon the loss of utility-sourced power.

In some arrangements, the environmental control unit may include a visual alarm electrically interfacing with the controller. When a gas concentration is determined by the controller to be outside a predefined range, the controller may direct the visual alarm to emit light. In some of those arrangements, the visual alarm may be a first color when the gas concentration is determined to be within a first range outside the predefined range and may be a second color when the gas concentration is determined to be within a second range outside both the predefined range and the first range. In some of those arrangements, the environmental control unit may include an audible alarm which emits a sound when the gas concentration is determined to be within the second range.

In some arrangements, the environmental control unit may include an exterior control panel having a plurality of buttons. When each button is depressed, it may activate one of the environmental devices. In some of those arrangements, one of the buttons, when depressed, may activate an environmental device to run for a predefined time cycle. In some of those arrangements, the exterior control panel may include indicia corresponding to each of the environmental devices. Each of the indicia may illuminate when its corresponding environmental device is activated.

In some arrangements, the environmental control unit may include an alarm horn which emits an audible sound upon loss of electrical power to the environmental control unit.

In some arrangements, the environmental control unit may include a push-button. When the button is depressed, at least one preset phone number may be automatically dialed.

In some arrangements, the environmental control unit and a transmitting device may form an environmental control system.

Another aspect of the technology is a process for using the ECU to control a plurality of environmental devices within a defined space. When a signal transmitted by a transmitting device is received by a receiver in the ECU located more than 150 feet away from the transmitting device, a controller in the ECU may control the environmental devices. In some arrangements, the environmental devices may also be activated by pressing a button located on the exterior of the ECU. In some arrangements, one of the environmental devices may be an air cleaning device in which the cleanliness of a filter within the air cleaning device may be measured by the pressure differential across it. When an unclean filter is detected, the controller may illuminate a light on the exterior of the ECU and a notification device may send messages to a predetermined recipient. In some arrangements, when the ECU loses power, the controller may activate an alarm horn and a notification device may send messages to a predetermined recipient. In some arrangements, when the ECU detects smoke or fire in the defined space, the controller may de-energize and shut down the environmental devices and a notification device may send messages to a predetermined recipient. In some arrangements, when the concentration of a toxic gas is detected in the defined space by a gas sensor, the gas sensor may send an electrical signal to a remotely located gas monitoring device, which may determine whether the concentration has fallen below or risen above a predefined level. If the concentration has risen above the predefined level, the controller may activate one of the environmental devices to draw the toxic gas out of the defined space until the concentration of the toxic gas falls below the predefined level. In some of those arrangements, the controller may also activate a visual or audible alarm at the same time and a notification device may send messages to a predetermined recipient. In some arrangements, when the temperature measured in the defined space is detected by a temperature sensor to be above a predefined range, the controller may activate one of the environmental devices to draw hot and humid air out of the defined space until the temperature is determined by the controller to be within the predefined range. In those arrangements, a notification device may send messages to a predetermined recipient at the same time.

BRIEF DESCRIPTION OF THE DRAWINGS

For a fuller understanding of the nature and objects of the invention, the following detailed description should be read with the accompanying drawings, in which.

DETAILED DESCRIPTION

As used herein, the term 'electrical signal' refers to such signals that may be created by an electrical current.

Figure 1:
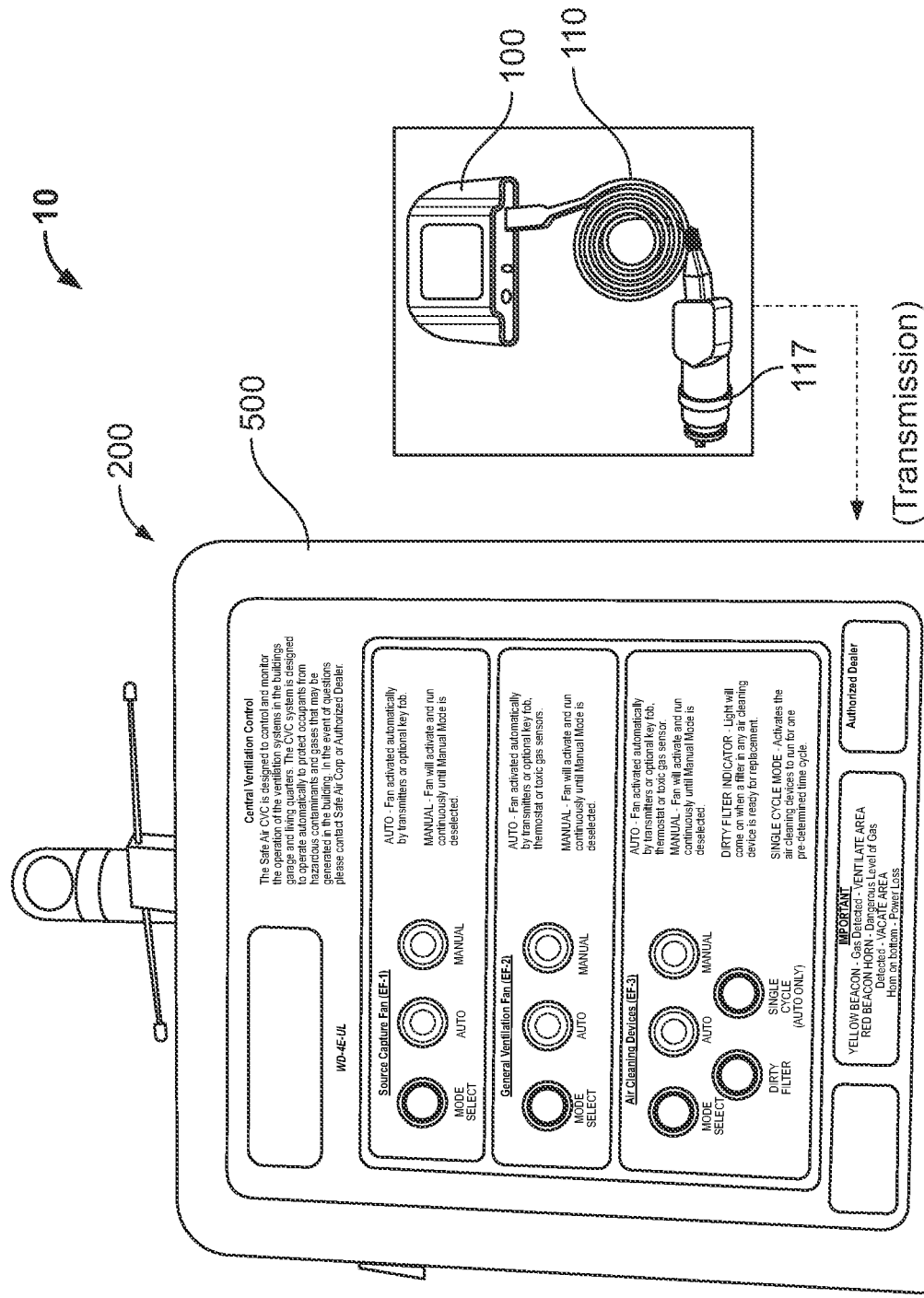
FIG. 1 shows plan views of an environmental control unit (ECU) and a transmitting device of an environmental control system in accordance with an embodiment of the technology.

Referring now to the drawings, as shown in the exemplary embodiment of FIG. 1, environmental control system 10 includes transmitting device 100 and environmental control unit (ECU) 200. Transmitting device 100 transmits signals, such as but not limited to radiofrequency signals which, when received by the ECU, automatically starts one or more environmental devices which may be located throughout a facility or other defined space.

As in this example, transmitting device 100 may be powered by a vehicle when the vehicle ignition is running or when the transmitting device is electrically connected to a battery in the vehicle, such as when the vehicle accessory drive is activated by rotating an ignition key. Radiofrequency signals from transmitting device 100 are received by receiver 320 (shown in FIG. 4) of ECU 200, upon which the receiver communicates with controller 330 of the ECU, to initiate the operation of the environmental devices, which may be but are not limited to, an exhaust fan (identified on an exterior control panel of the ECU as EF-1), a general ventilation fan (identified on an exterior control panel of the ECU as EF-2), and an air cleaning device which may include any of but is not limited to including, a filter fan (identified on an exterior control panel of the ECU as EF-3), a filter, and open/close motor drive dampers.

Referring to FIGS. 2A-2C, 3A, and 3B, transmitting device 100 is a plug-and-play, single-button, single-channel transmitter (SECO-LARM Model No. SK-919TDWS-BU), although in alternative embodiments a multi-channel transmitter may be used. Transmitting device 100 may be mounted on a dashboard of a vehicle, such as but not limited to, by a VELCRO® fastening system. Transmitting device 100 includes circuit board 180 and electrical port 120 for deriving electrical power from a vehicle. Connector 110, which as shown may be but is not limited to being a micro-universal serial bus (USB) connector, is connected by first plug 116 of the connector to port 120 which is electrically connected to an electrical circuit on the inside of transmitting device 100. In alternative arrangements, the connector may be any of a mini-USB, a standard USB, and the like. Second plug 118 of connector 110 on an end of the connector opposite first plug 116 may be connected directly to a USB outlet of a vehicle which supplies electrical power or may be connected to either of sockets 114a, 114b which may be but are not limited to being USB sockets, of adapter 117, which as shown may be but is not limited to being a lighter plug adapter. Adapter 117 may include plug 112 on an end of the adapter opposite sockets 114a, 114b for connection to a lighter socket of a vehicle which supplies electrical power. In arrangements using adapter 117, the other of sockets 114a, 114b of adapter 117 that is not connected to second plug 118 may be connected to a peripheral device, such as but not limited to a device configured for a USB connection including a laptop, tablet or phone. In another arrangement (not shown), transmitting device 100 may be electrically connected to a vehicle by a connector having, on one end, a first plug substantially similar to first plug 116 of connector 110 which may be connected to port 120 and thus to the electrical circuit on an inside of transmitting device 100 and, on an opposite end, a lighter plug directly and inseparably, i.e., integrally, connected to the first plug for mating connection to a cigarette-lighter style socket of a vehicle which supplies electrical power. In any of these arrangements, including the arrangement shown in FIGS. 2A, 2B, 3A, and 3B, transmitting device 100 may include one or more fuses such as fuses 111, 113 and 115 (shown in FIG. 2B) connected to the electrical circuit on the inside of transmitting device 100 to protect the device from surge. The transmitting device 100 does not require any custom installation wiring. In this manner, transmitting device 100 is conveniently portable.

When powered, transmitting device 100 preferably may transmit a signal at a frequency of 315 MHz or 433.92 MHz, although in alternative embodiments other frequencies may be used. Transmitting device 100 includes power indicator 130, which as shown may be but is not limited to being a light emitting diode (LED) (shown in FIG. 2). The power indicator as in this example may turn blue to indicate that power is being supplied to the unit. Power indicator 130 is turned off in this example when power is not being supplied to transmitting device 100. As in this example, transmitting device 100 also includes transmission indicator 140, which as shown may be but is not limited to being an LED. The transmission indicator as in this example may turn red to indicate that the device is transmitting signals. As the device transmits signals for a period of time, the transmission indicator 140 flashes for that period of time, which as in this example may be 1 second. It subsequently stops flashing to minimize power consumption when the device stops transmitting for an interval of time, which as in this example may be 15 seconds. The transmission indicator turns back on when the device starts transmitting again. As further shown in FIG. 2, transmission device 100 may include power button 150 that may be pressed manually to stop, i.e., override, the transmission of signals at any time while the transmitting device is receiving power, such as from a vehicle.

Figure 2A:
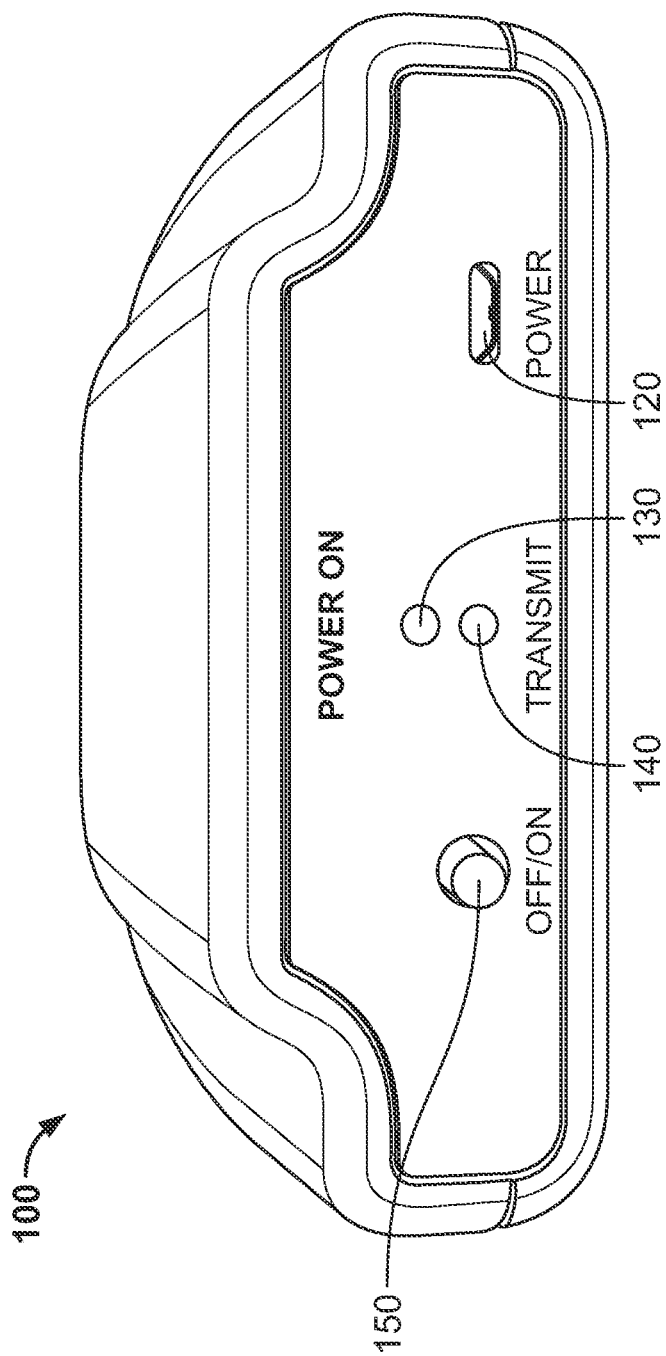
FIG. 2A is a perspective view of the transmitting device of FIG. 1.
Figure 2B:
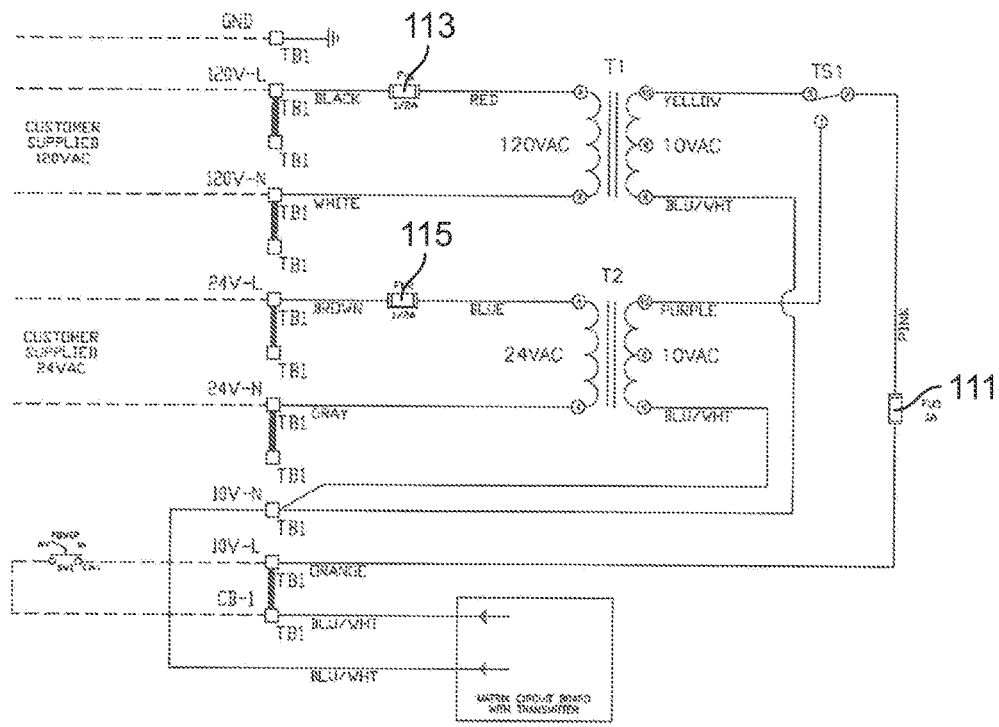
FIG. 2B is a circuit diagram of the transmitting device of FIG. 1.
Figure 2C:
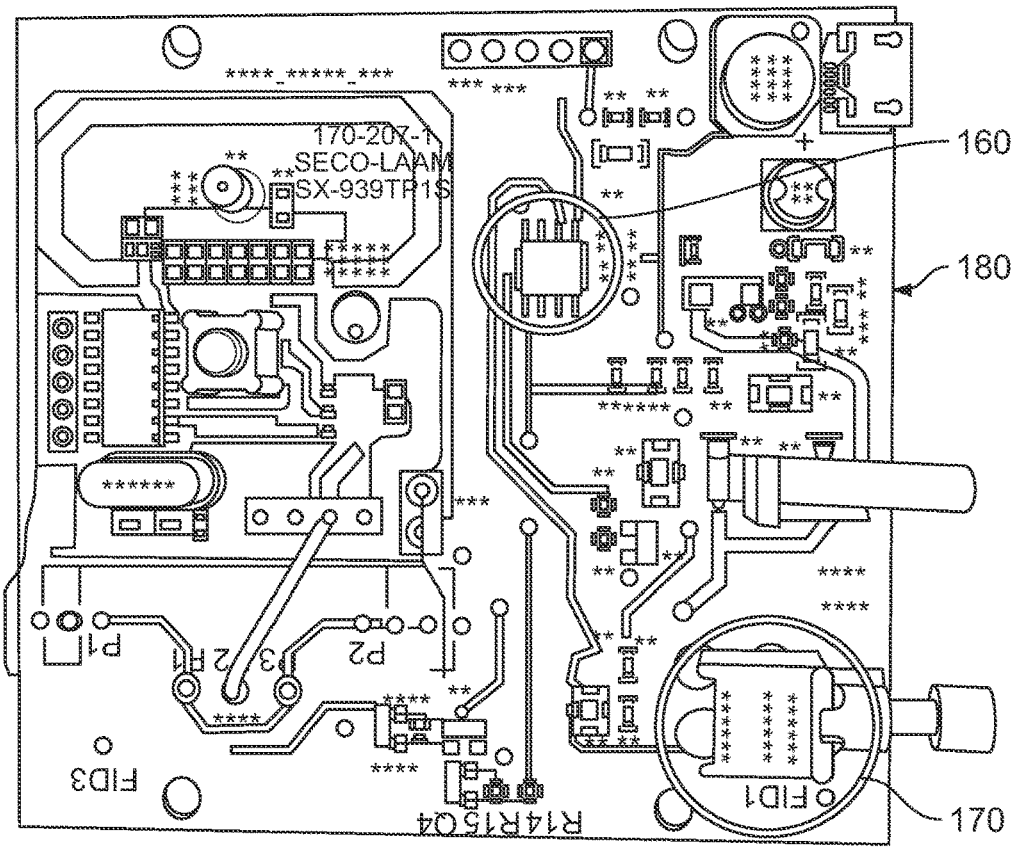
FIG. 2C is a plan view of the circuit board inside the transmitting device of FIG. 1.
Figure 3A:
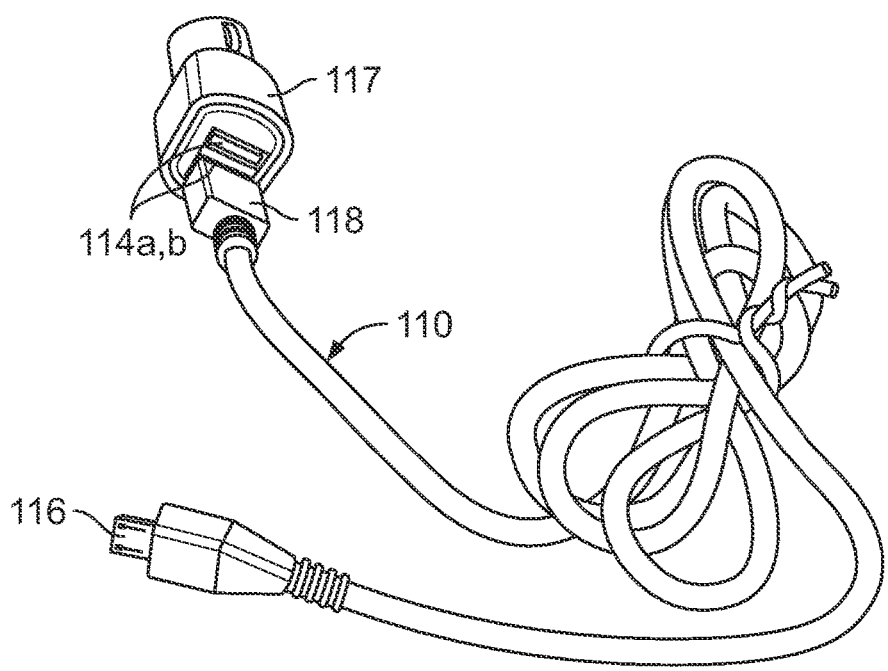
FIG. 3A is a perspective view of an end of a prior art connector of the transmitting device of FIG. 1.
Figure 3B:
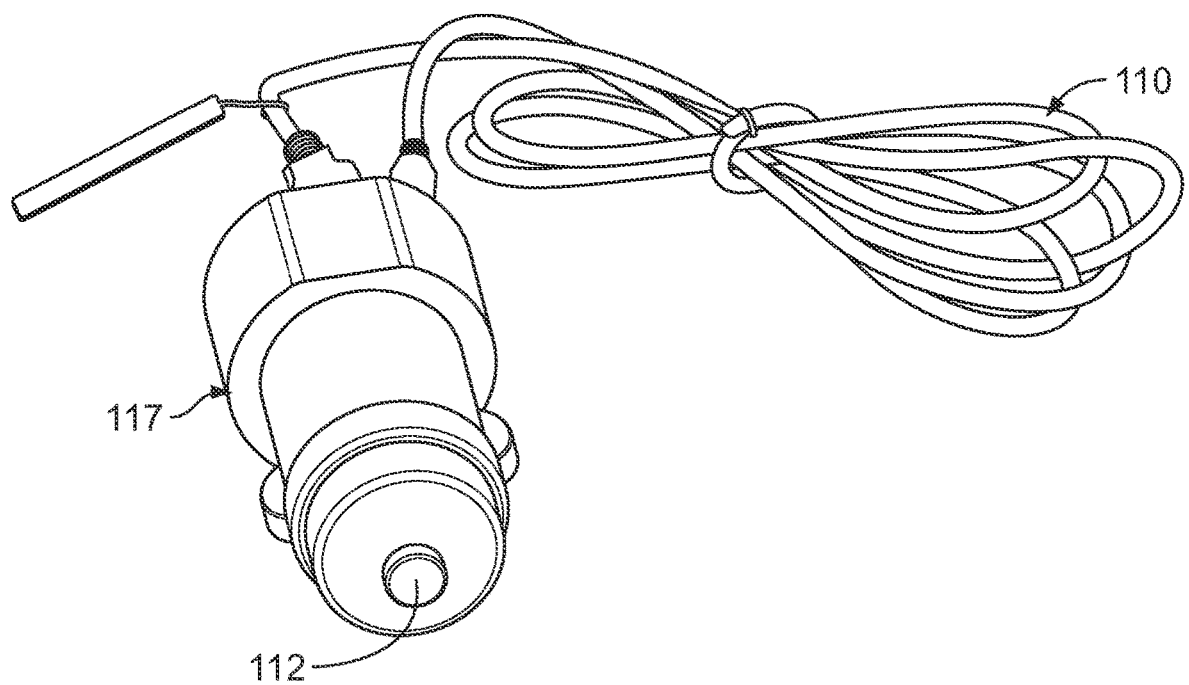
FIG. 3B is a perspective view of another end of the prior art connector of FIG. 3A.

The electrical circuit on the inside of transmitting device 100 includes, among other components, microprocessor 160 and transmitter 170 on circuit board 180, as in this example depicted in FIG. 2C. Microprocessor 160 i pre-programmed with a dual timer function, although in other arrangements, the microprocessor may include a single timer function or another number of timer function. A first timer of the dual timer function activates a transmission signal output a preset first interval of time after there is no signal output, e.g., after a second timer of the dual timer function has turned off the signal output. The second timer of the dual timer function turns off the transmission signal output a preset second interval of time after there is a signal output, e.g., after the first timer of the dual timer function has activated the signal output from the transmitting device. In this manner, for example, transmitter 170 within transmitting device 100 may transmit radiofrequency signals for 1 second, stop transmitting radiofrequency signals for 15 seconds, and then repeat this sequence until transmitting device 100 is disconnected from electrical power, including by manual disruption of power when power button 150 is depressed. Transmitting device 100 includes a variable voltage circuit, which includes two current pathways allowing the device to operate on multiple voltages, in this example on either 5 VDC such as when the device is powered through a USB socket or 12 VDC such as when powered through a cigarette lighter socket. In this manner, transmitting device 100 may be used within a vehicle.

Figure 4:
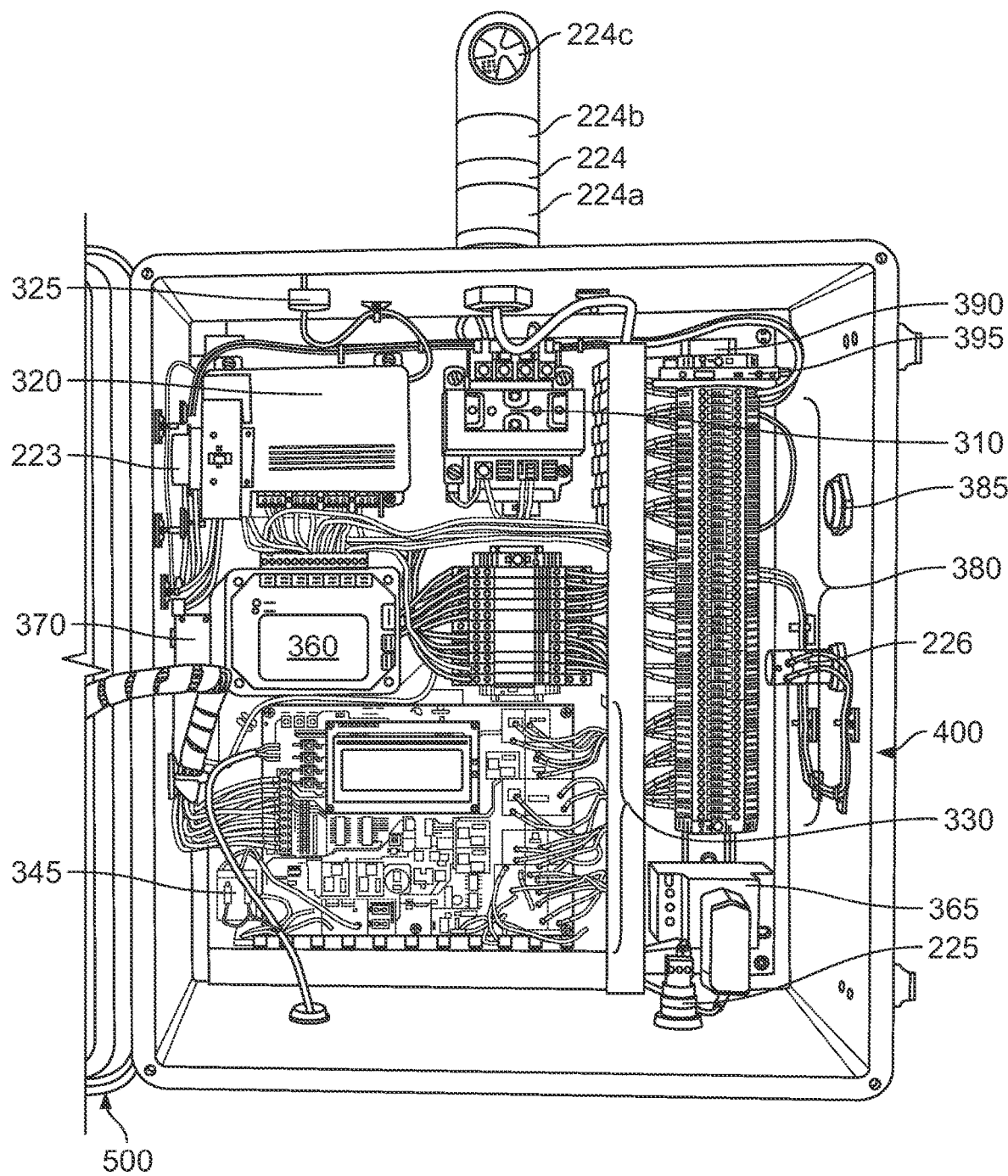
FIG. 4 is a plan view of an inner box of the ECU of FIG. 1.
Figure 5:
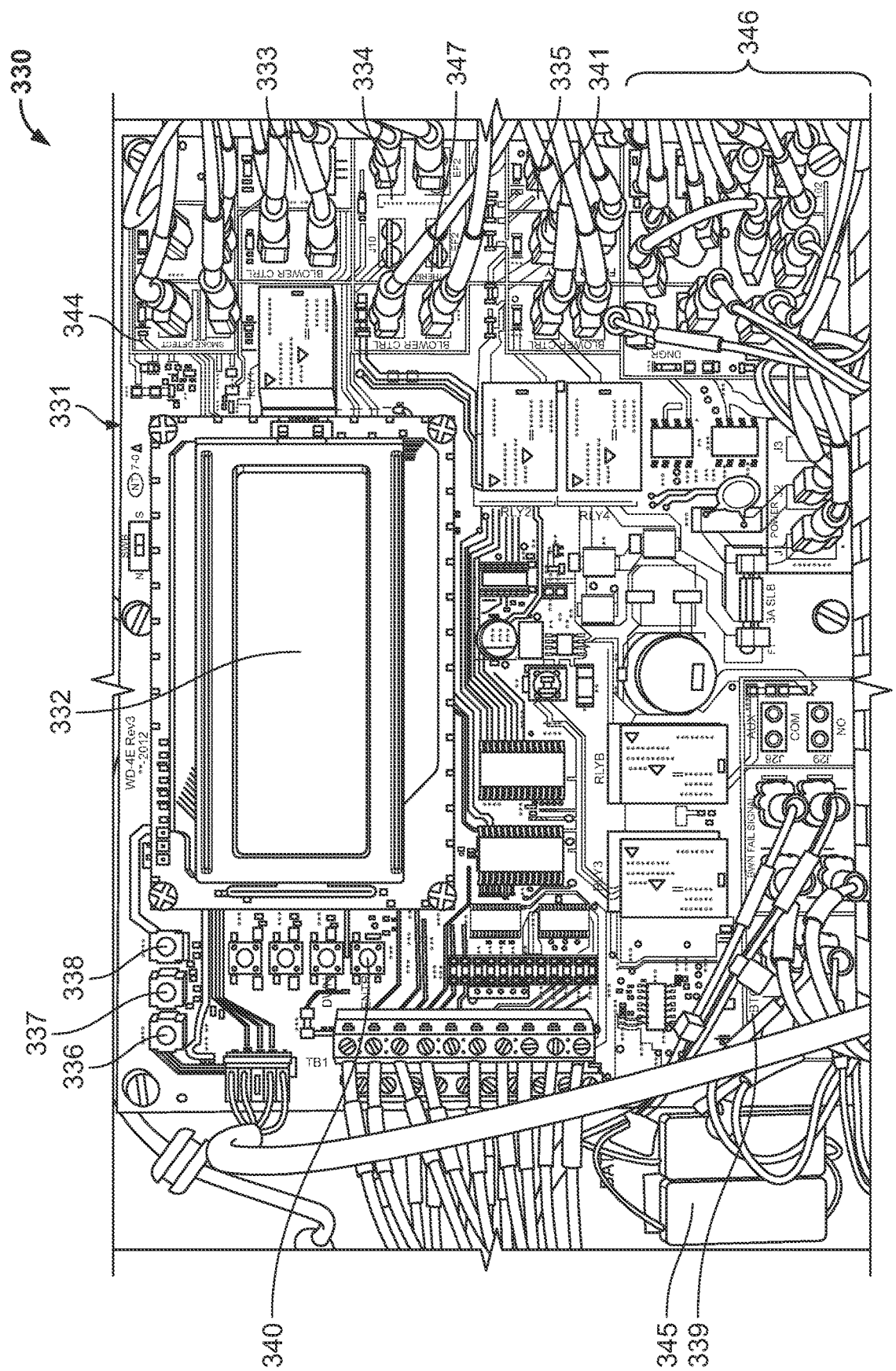
FIG. 5 is a plan view of a controller within the inner box of FIG. 4.
Figure 6:
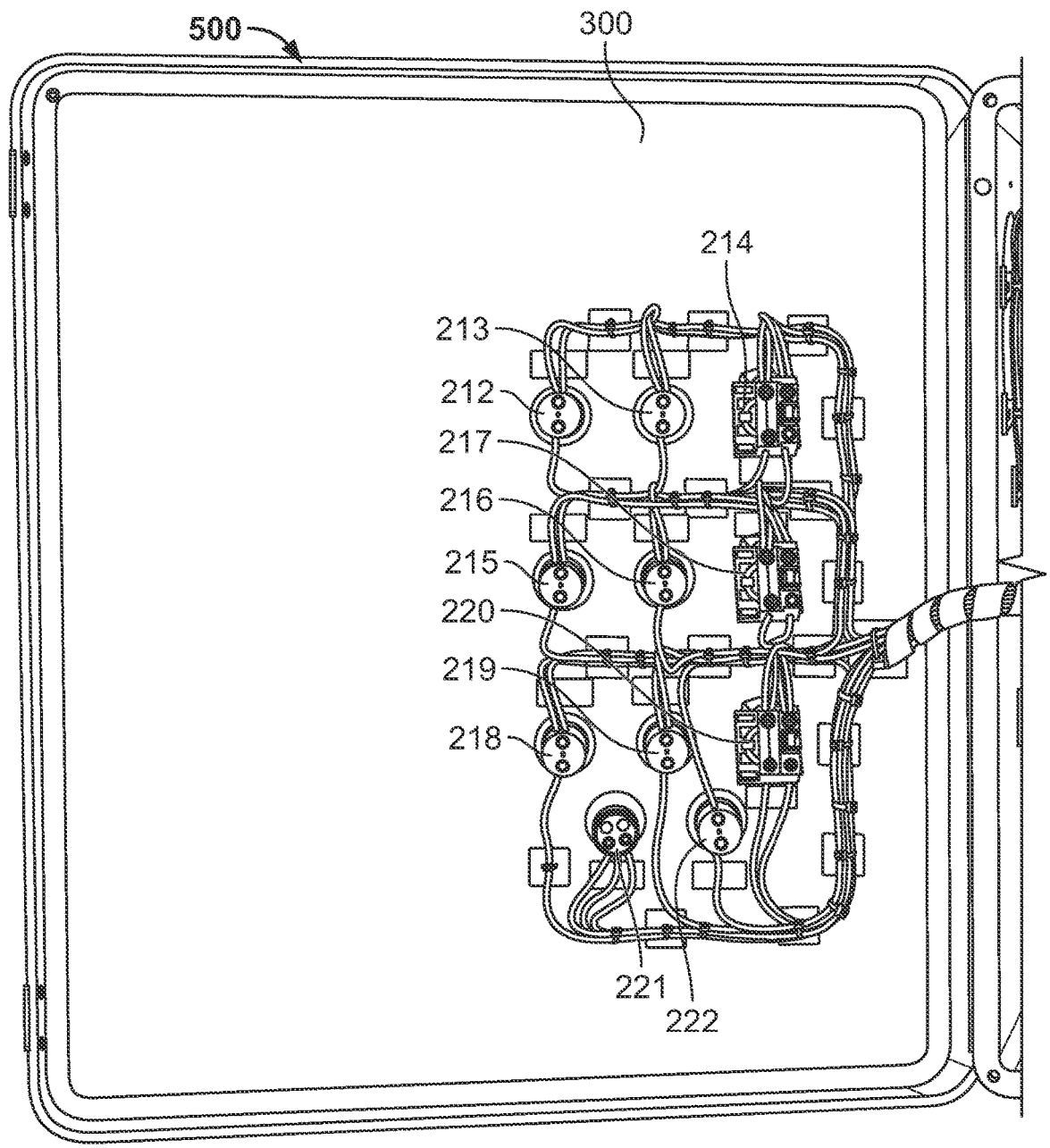
FIG. 6 is a plan view of an inner portion of a cover of the ECU of FIG. 1.
Figure 7:
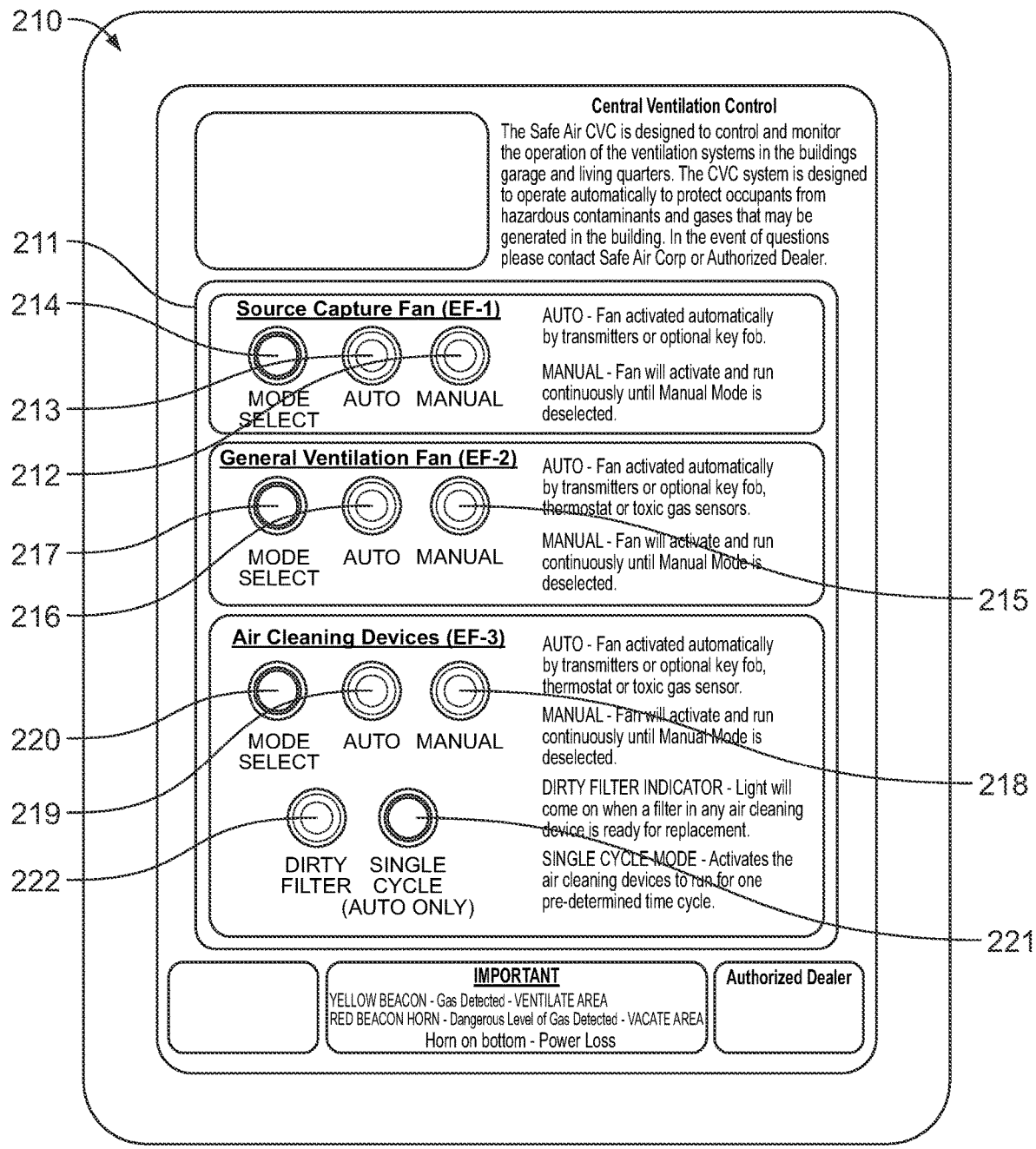
FIG. 7 is a plan view of an outer portion of the cover of FIG. 6.

Referring now to FIGS. 4-7, ECU 200 includes inner box 400 and cover 500. Cover 500 includes interior side 300 facing componentry within inner box 400 and exterior side 210 having control buttons 212-222 facing outwardly, as best shown in FIGS. 6 and 7. As best shown in FIGS. 4 and 5, inner box 400 of ECU 200 generally includes the following:

(i) control transformer 310, which as shown may be but is not limited to being a 24 VAC transformer such as CUTLER HAMMER Model No. C0100E1B;

(ii) radio receiver 320, which as shown may be but is not limited to being SECO-LARM Model No. SK-910R4Q, for receiving radiofrequency signals from transmitting device 100 and wire 325 that connects the receiver to an external antenna;

(iii) microprocessor-based controller 330 which includes circuit card 331, display 332, which as shown may include but is not limited to including an LED screen and a microprocessor connected to and located under the display screen;

(iv) backup power supply 345, which as shown may be but is not limited to being ENERCELL Model No. 2300404, and which may be hard-coded into controller 330 to prevent loss of programming logic in the controller in the event of a loss of utility-sourced power;

(v) message system 360, which as shown may be but is not limited to being a Service Email Notification Deployment (SEND) system such as SENSAPHONE Model No. FGD-W600, which may be but is not limited to being electrically powered through outlet 365;

(vi) uninterruptible power supply, such as but not limited to, battery 370 to electrically power the message system 360 in the event of a loss of utility-sourced power;

(vii) termination block 380 for connecting accessories including but not limited to environmental devices;

(viii) opening 385 for connecting an external gas detection system, such as but not limited to HONEYWELL E3Point Gas Monitor to controller 330;

(ix) outlet 390 for connecting ECU 200 to utility-sourced power;

(x) fuse 395 for protecting ECU 200 from surge; and (xi) miscellaneous fuses, terminals and relays.

Transformer 310 receives utility-sourced power, typically 120 VAC from a wall outlet, to power ECU 200 and converts the utility-sourced power into power, typically by stepping down the voltage to 24 VAC, that is usable by the various components, such as items (i)-(xi) identified above, of inner box 400 of ECU 200. Receiver 320 receives the radiofrequency signals from transmitting devices, such as but not limited to transmitting device 100 or other devices transmitting signals at its same radiofrequency, and sends a signal to controller 330. As in this example, the receiver 320 may receive and react to signals from an unlimited number of transmitting devices, which may be located in a corresponding unlimited number of vehicles. Subsequently, as in the example of ECU 200, receiver 320 sends an electrical signal to controller 330 via two wires.

Figure 8A:
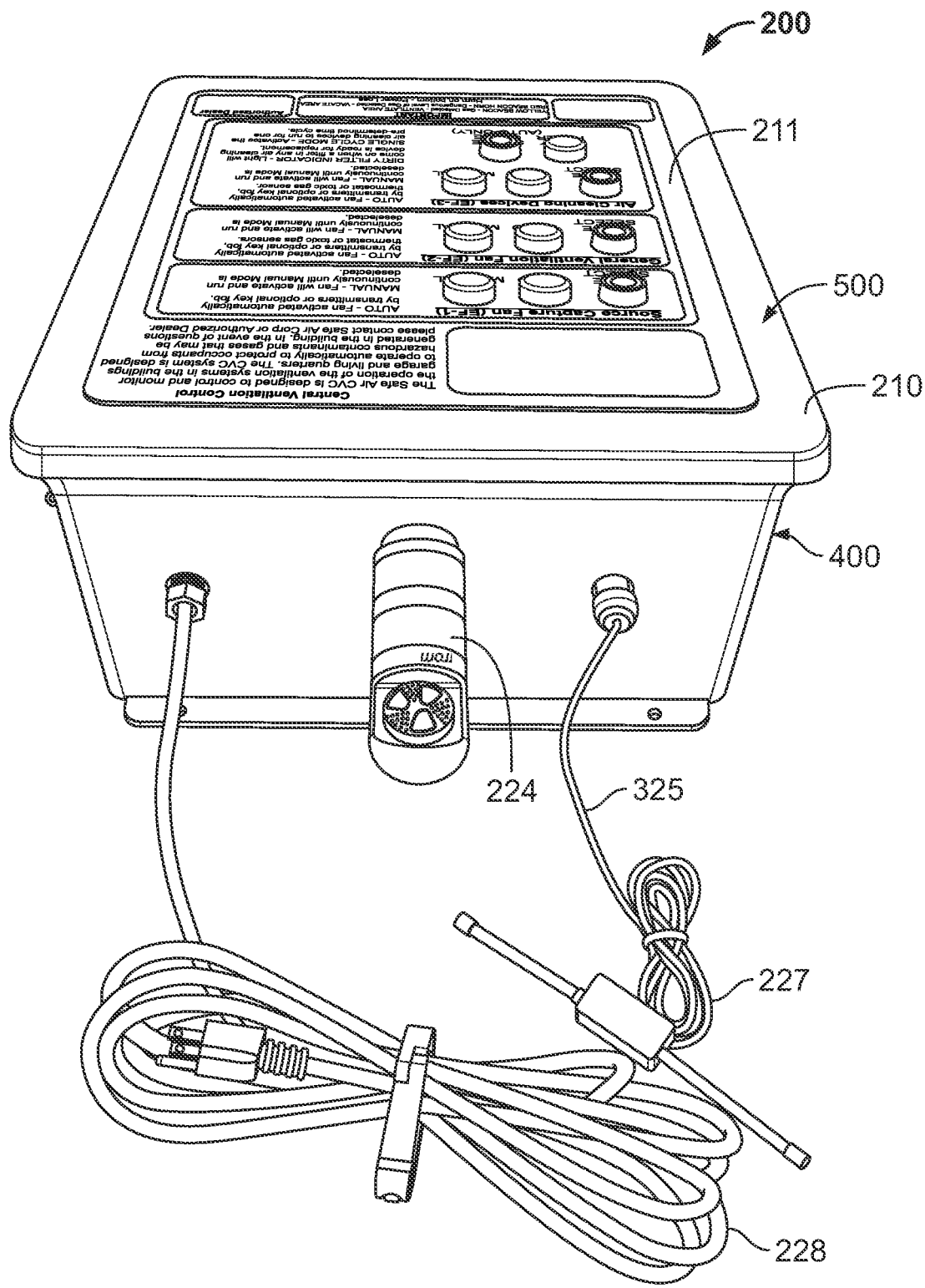
FIG. 8A is a perspective view of the ECU of FIG. 1.

Referring to FIG. 8A, antenna 227, (which as in the example shown may be SECO-LARM Model No. SK-91ERSD) which is flexible and has an extended range of up to 500 feet, is located outside of, and in some instances remote from, ECU 200. Antenna 227 is connected to receiver 320 inside box 400 via wire 325 (see also FIG. 4). Antenna 227 provides receiver 320 with additional range to detect the radiofrequency signals sent by transmitting device 100 such that the signals may be received by receiver 320 up to a maximum distance of at least 1000 feet from the receiver.

As further shown in FIG. 8A, power cord 228 provides a connection for the ECU 200 to a wall outlet to receive the utility-sourced power. In this manner, controller 330 receives the power necessary to automatically activate and control the operation of the different environmental devices. In particular, controller 330 controls and can contemporaneously operate three sets of fans labeled on exterior control panel 210 of cover 500 as EF-1, EF-2 and EF-3 (as best shown in FIG. 7) for the purpose of maintaining high air quality in a facility or other defined space. The microprocessor of controller 330 can activate the battery power supply 345 to prevent disruption of the controller due to overcurrent, short circuit, ground fault, power loss, etc.

Message system 360 can send preconfigured message, e.g., any of e-mail and text alerts, about a plurality of environmental parameters, in this example up to six parameters, to a plurality of designated recipients, in this example up to eight constituent addresses. Such messages may be, but are not limited to being, sent in the event of any of (1) the loss of power to ECU 200, (2) determination of high and dangerous levels of concentrations of carbon monoxide, nitrogen dioxide and other toxic gases in a facility or other defined space, (3) determination of dirty filters in an air cleaning device, (4) determination of fire/smoke in a facility or other defined space, (5) determination of high temperatures of exhaust gases in ductwork forming part of an exhaust system and (6) initiation of a service call.

Figure 8B:
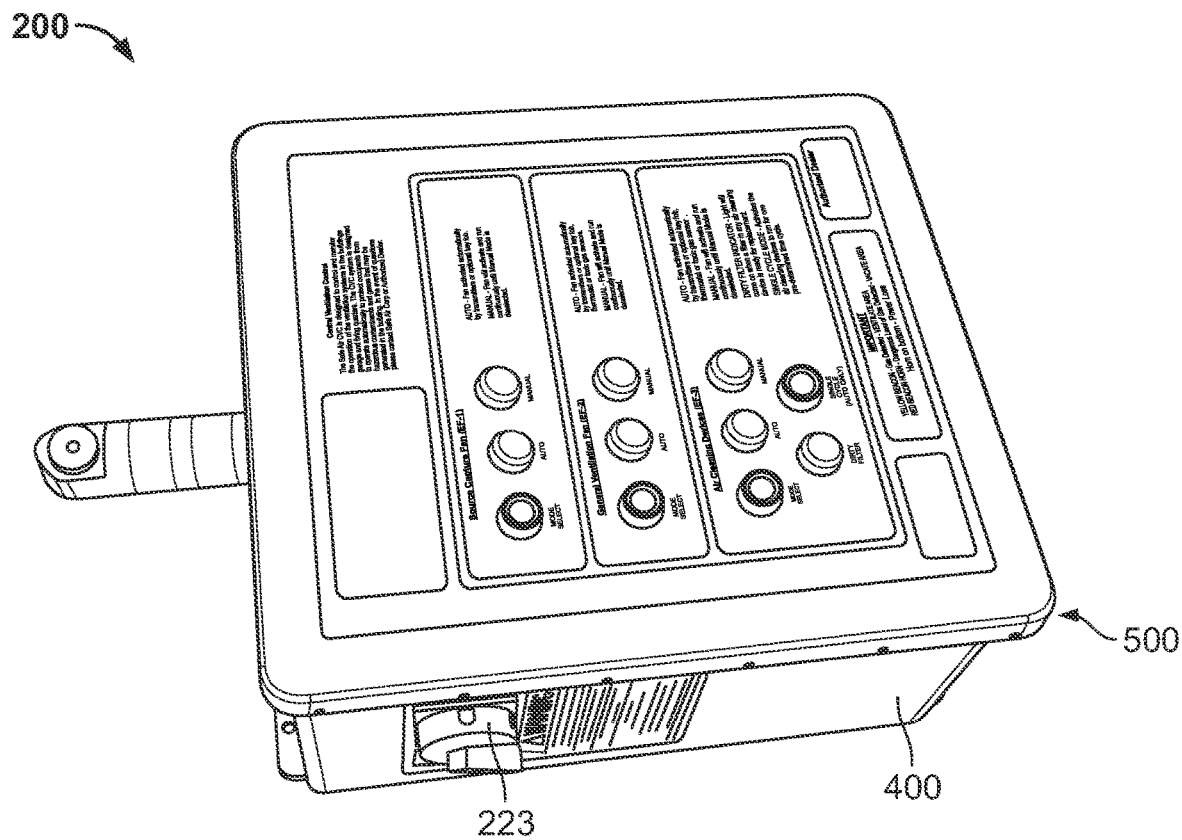
FIG. 8B is another perspective view of the ECU of FIG. 1.
Figure 8C:
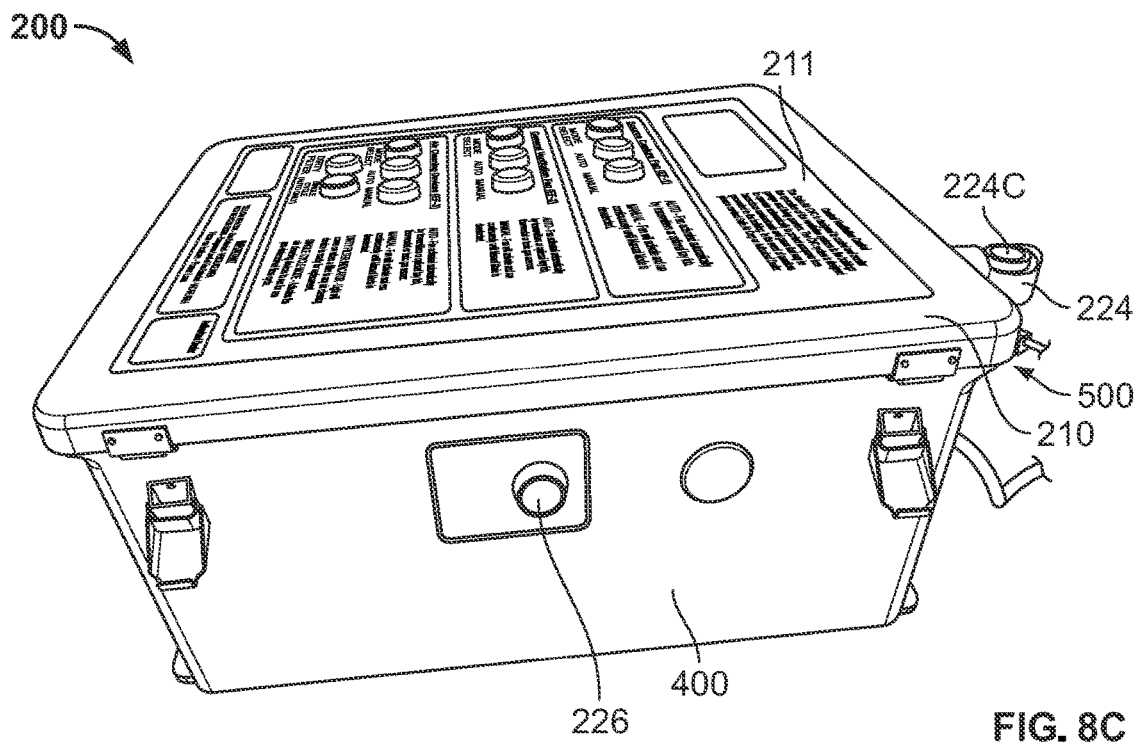
FIG. 8C is another perspective view of the ECU of FIG. 1.

With reference now to FIGS. 8B and 8C, cover 500 of ECU 200, as in the example shown, may be made of a corrosion-resistant fiberglass. Cover 500 is latchable to and key-lockable to inner box 400. Inner box 400 includes lockout/tag-out service switch 223 which, when employed, manually disconnects electrical power to ECU 200 and prevents continued operation of the ECU.

Referring again to FIGS. 6 and 7, exterior control panel 210 of cover 500 of ECU 200 includes self-adhesive membrane overlay 211 on an outermost layer and surrounds control buttons 212-222 for the fans designated as EF-1, EF-2 and EF-3. Each button 214, 217, 220 on the control panel may be toggled between an automatically operational state labeled "AUTO" and a manually operational state labeled "MANUAL" in which the respective fan operates on user demand without direction from the controller. Buttons 212, 215, 218, (which as shown may be LED indicators) when illuminated indicate that the fans designated as EF-1, EF-2 and EF-3 respectively, are being manually operated. Similarly, buttons 213, 216, 219, (which as shown may be LED indicators) when illuminated indicate that the fans designated as EF-1, EF-2 and EF-3 respectively, are running automatically. In this example, buttons 213, 216, 219 remain illuminated by default upon activation of the respective fans until the manual mode is selected using the respective toggle buttons 214, 217, 220. In the manual mode, the respective fans will activate and run continuously until the manual mode is de-selected using the respective toggle button for each fan.

As in this example, button 221 on the exterior control panel 210 of cover 500, which as shown may be labeled "Single Cycle (Auto Only)", when depressed, activates and runs the fan designated as EF-3 for a single pre-determined time period. As in this example, button 221 may be functional only when button 220 on exterior control panel 210 is toggled to automatic mode, i.e., when button 219 is illuminated, such that the fan designated as EF-3 associated with an air cleaning device is operating automatically. In this regard, button 222 illuminates when a dirty filter is detected in the air cleaning device associated with the fan designated as EF-3.

As best shown in FIG. 4, ECU 200 includes sensory alarm 224, which operates when a predefined level of gas, which may be but is not limited to a toxic gas, is detected in a facility or a defined space. As in the example shown, sensory alarm 224 may have but is not limited to having yellow strobe indicator 224a, which emits a yellow light, red strobe indicator 224b, which emits a red light, and speaker 224c, which, when activated, may produce a loud, e.g., an approximately 95 dB or higher, audible alarm, as further described herein.

As best shown in FIGS. 4 and 8C, on an exterior of inner box 400 on a side opposite a hinge attaching cover 500 to the inner box is button 226, which as shown may be marked "Push to Call". Button 226, when pushed, directs message system 360 of inner box 400 to send an alert to predetermined recipients, such as but not limited to any of service and maintenance personnel which may be located remotely from a facility at which ECU 200 is located as well as a manager responsible for the facility at which ECU 200 is located who may then respond appropriately such as by calling the facility. As in this example, ECU 200 may be configured such that message system 360 sends an alert after button 226 is held for five (5) seconds. In this manner, personnel in a facility or other defined space using ECU 200 may seek prompt technical assistance.

Operation and Control of Fans

Controller 330 can control multiple environmental devices to reduce pollutants in the air of a defined space to meet the standards of the Occupational Safety and Health Administration and Indoor Air Quality. The components that control the operation of the fans designated as EF-1, EF-2, and EF-3 can be seen in the close-up view of circuit card 331 in FIG. 5. Controller 330 contains LED display 332 which indicates whether each of the fans designated as EF-1, EF-2, and EF-3 is running. Adjustments of the runtimes of the fans designated as EF-1, EF-2, and EF-3 may be made independently of each other using three potentiometers 336, 337, and 338, respectively, each connected to a respective set of timers programmed in the microprocessor of the controller. The timers log the runtime (preferably but not necessarily in hours) of each of the fans designated as EF-1, EF-2 and EF-3. Each of the timers is resettable via push button 340 located adjacent to the LED display 332. Circuit card 331 also includes three sets of "Remote Start" terminal blocks 333, 334, 335 (which as shown each may be ALLEN BRADLEY Model No. 1492-J3) which transmit signals to activate each of the fans designated as EF-1, EF-2 and EF-3. Terminal blocks 333, 334, 335 are activated remotely, such as by a remote dry contact at an outside source, when receiver 320 receives the radio signal from the transmitting device 100. This "Remote Start" functionality ceases upon loss of the radio signal from transmitting device 100, for example, when a vehicle with transmitting device 100 is outside the signal-receiving range of ECU 200.

The fan designated as EF-1, which may be an exhaust fan or a plurality of exhaust fans, extracts exhaust gases from a vehicle or vehicles in a facility or other defined space environmentally controlled by ECU 200 to the atmosphere via a ducted system, which is hardwired to the microprocessor of controller 330 via circuit card 331. Controller 330 activates the exhaust fan designated as EF-1 via terminal block 333 when receiver 320 receives a radio signal from transmitting device 100. The exhaust fan designated as EF-1 continuously operates during receipt of radio signals by receiver 320 from transmitting device 100 for an adjustable amount of time, which as in this example may be, but is not limited to being, in the range of 1-5 minutes and set by potentiometer 336, or until the signal transmission has been deactivated.

The second fan designated as EF-2, which may be a general ventilation fan or a plurality of general ventilation fans, extracts air from within a facility or other defined space environmentally controlled by ECU 200 to the atmosphere. Similar to the exhaust fan designated as EF-1, the ventilation fan designated as EF-2 is activated by controller 330 via terminal block 334 when receiver 320 receives a radio signal from transmitting device 100. The fan designated as EF-2 runs during receipt of radio signals by receiver 320 from transmitting device 100 for an adjustable amount of time or until the signal transmission has been deactivated.

The fan designated as EF-2 is also activated when a concentration of toxic gases above a threshold level is detected in the facility or other defined space environmentally controlled by ECU 200 by external gas sensors located remotely, such as but not limited to, in ductwork connected to the ventilation fan. The gas sensors communicate, by an electrical connection, the presence of toxic gases in at least a portion of the facility or other defined space, such as but not limited to a space in the ductwork of the facility, to an external gas monitoring device (such as but not limited to the HONEYWELL E3 Point Gas Monitor) which is hardwired to the microprocessor in the controller 330 via circuit card 331 through terminal area 346. The ventilation fan designated as EF-2 continues to run for an adjustable amount of time until there is an indication from the gas monitoring device that toxicity levels measured by the external gas sensors have come down to an acceptable level below the threshold. The runtime of the fan designated as EF-2 is adjusted by potentiometer 337 and may be as in this example, but is not limited to being, in the range of 5-30 minutes to meet an Air Exchange Rate (AER) requirement.

Referring to FIG. 5, the fan designated as EF-2 can be activated by a thermostat, which is hardwired to the microprocessor of controller 330 via circuit card 331 at terminal 347, and measures the temperature in the facility or defined space. When the microprocessor of controller 330 determines that the temperature is outside a predefined temperature range, and in particular is above a predefined temperature, the controller activates the fan designated as EF-2 to draw any of hot and humid air out of the facility until there is an indication from the thermostat that the temperature is within the predefined range. In this manner, the temperature of the facility or the defined space may be regulated such that power consumption is minimized.

The fan designated as EF-3 which in this example forms part of an air cleaning device is used for any of filtering and cooling air within a facility or defined space. The fan designated as EF-3 is activated by the microprocessor of controller 330 via terminal block 335 when receiver 320 receives a radio signal from transmitting device 100, and operates for an adjustable period of time. The adjustable time-period, set by potentiometer 338, is independent of the adjustment of the time-periods of operation for the fans designated as EF-1 and EF-2 and as in this example may be, but is not limited to being, in the range of 1-30 minutes to meet an AER requirement. Button 221 on exterior control panel 210 of cover 500 providing a "Single Cycle (Auto Only)" activates the fan designated as EF-3 to run for the time period set with potentiometer 338. Button 221 is functional only when button 219 on exterior control panel 210 corresponding to the automatic mode of the fan designated as EF-3 is turned on. The fan designated as EF-3 is controlled by the microprocessor in the controller 330 via a four-conductor cable hardwired to the circuit card, which as in this example may operate on 24 VAC and carry an electrical "RUN" signal from the microprocessor to the fan designated as EF-3. Two additional wires carry an electrical "FILTER DIRTY" signal from the fan designated as EF-3 back to the microprocessor to indicate whether a filter or filter unit in the air cleaning device is dirty. The "RUN" and "FILTER DITY" signals may be carried across wires in parallel with other wires carrying like signals from filter unit to filter unit. In this manner, controller 330 can control multiple air cleaning devices required to dilute and treat the air. As known to those of ordinary skill, power wiring for the air cleaning devices comes through a relay to the motor of each air cleaning device. Within any of the air cleaning devices, a differential pressure switch electrically interfacing with the microprocessor of controller 330 is wired between two terminal blocks (not shown) to measure a pressure drop across the air cleaning device such that the microprocessor in the controller can determine if the filters within the device are dirty. The differential pressure switch is hardwired to the microprocessor of controller 330 via circuit card 331 such that when the filters are determined by the microprocessor to be dirty, indicator button 222 on exterior control panel 210 illuminates. This illumination alerts an operator to inspect each filter in the air cleaning devices. At the same time, as in this example, message system 360 sends any of an email and text alert to predefined personnel, who can then take action to have the filter changed.

Measuring Toxicity of Exhaust Gases

External gas sensors can be placed in ductwork associated with the exhaust fan designated as EF-1 and can be connected to a gas monitoring device (such as the HONEY- WELL E3Point Gas Monitor), which may be located adjacent to ECU 200 and hardwired to the microprocessor via circuit board 331 through terminal area 346 of controller 330 of ECU 200. The gas monitoring device monitors the concentration of gases measured by the gas sensors in the ductwork. The gas monitoring device receives a constant input signal from any of the gas sensors by way of relay closures. If a microprocessor within the gas monitoring device determines that the concentration of a gas has met or exceeded a threshold level of toxicity, an electrical signal is sent from the gas monitoring device to controller 330 which in turn activates sensory alarm 224 (which may be but is not limited to being BANNER Model No. TL50HYRAL52CP-19821) attached to ECU 200. If a level of toxicity is determined by the gas monitoring device to be at or above a predefined "High" value of toxicity but less than a predefined "Dangerous" value, controller 330 activates flashing yellow indicator 224b. In this instance, controller 330 activates the general ventilation fan designated as EF-2 to bring the toxic gas level down to a safer level. At the same time, the controller 330 directs the message system 360 to send any of an email and text alert to designated personnel, who can then read the level of the toxic gas in a display of the gas monitoring device. If the level of toxicity is determined by the microprocessor to be at or above the predefined "Dangerous" level, controller 330 activates both flashing red indicator light 224a and audible alarm 224c. The general ventilation exhaust fan designated as EF-2 continues running but may not be able to reduce the level of toxicity sufficiently to clear the alarm. At the same time, controller 330 directs message system 360 to send any of an email and text alert to designated personnel, who can then take action to have all doors in the facility or defined space opened, as appropriate, and to have the facility or defined space vacated until the alarm is cleared and the source of the toxic gas is discovered and remediated. Gases whose concentrations can be measured relative to predefined levels of toxicity are, but are not limited to, carbon monoxide, nitrogen dioxide, hydrogen sulfide, oxygen, hydrogen, methane and propane.

Measuring and Controlling Temperature of Exhaust Gases

The exhaust gas temperature may rise if a vehicle, such as a fire truck runs for too long or water pumps on the fire truck are operated by the engine such as during a pump check to confirm proper functionality of the water pumps. Moreover, temperatures in a vehicle's exhaust may rise up to 1000 degrees Fahrenheit when a vehicle's Diesel Particulate Filter (DPF) system filters the diesel exhaust and incinerates the diesel particulates captured by the filter. A temperature sensor located inside a source capture duct monitors the temperature of a vehicle's exhaust gases that escape into a facility or defined space through the ductwork connected between the vehicle and the exhaust system of the facility or defined space. The temperature sensor is hardwired to the microprocessor via circuit card 331 at terminal 339 of controller 330 of ECU 200. Circuit card 331 includes a temperature meter which records the temperature of the exhaust gases passing through the ductwork connected to the fan designated as EF-1. The maximum gas temperature recorded is displayed on the temperature meter located on the circuit card 331 of the controller 330 and is resettable via a small push button 340 located next to display 332. If the temperature of the exhaust gases passing through the ductwork is determined by the microprocessor to exceed a predefined threshold, the controller 330 activates the fan designated as EF-2 to drive out the hot air from the ductwork as soon as possible. At the same time, the controller 330 directs the message system 360 to send any of an email and text alert to designated personnel, who can turn off the vehicle and disconnect the exhaust system from the vehicle in order to allow the ductwork to cool down.

Detecting Smoke

Smoke alarm devices with relay outputs can be placed in a facility or defined space to detect the presence of smoke. These devices can be hardwired to the microprocessor of controller 330 via circuit card 331 through a terminal 344 of controller 330 of ECU 200. Upon detection of smoke in the facility or defined space, controller 330 de-energizes and shuts down all fan motors and dampers so that the ventilation system of the facility does not spread any potential fire or smoke. At the same time, controller 330 also directs message system 360 to send any of an email and text alert to designated personnel, who can then locate the fire or smoke and respond accordingly.

Detecting Power Loss

Referring again to FIG. 4, ECU 200 includes a battery backup system 370 which can activate and power alarm horn 225 (which may be but is not limited to being ALLEN BRADLEY Model No. 855P-B30SE22) to sound an audible alarm in the event of a loss of power to ECU 200. As in this example, alarm horn 225 operates for a minimum of 10 minutes after losing power, although this amount of time varies depending on the power supply being used for the battery backup system. At the same time, controller 330 directs message system 360 to send any of an email and text alert to designated personnel regarding the loss of power, who can then reset power at lockout/tag-out switch 223 on ECU 200 (see FIG. 8A) in the event the switch was actuated to cause the power loss, reset power at a breaker panel on a main power supply of a facility or defined space, or request a service call by pushing button 226 (see FIG. 8B) on ECU 200 for 5 seconds.

Auxiliary Function

ECU 200 can be paired with an optional keyfob transmitter (not shown) with four function buttons, one of which may activate fans EF-1, EF-2 and EF-3 in a manner similar to transmitting device 100. The other three buttons may activate dry contact relays located inside the ECU 200, which may be used for a number of auxiliary functions, including the activation of overhead door operations or traffic lights.

Process of Controlling Environmental Devices

Figure 9:
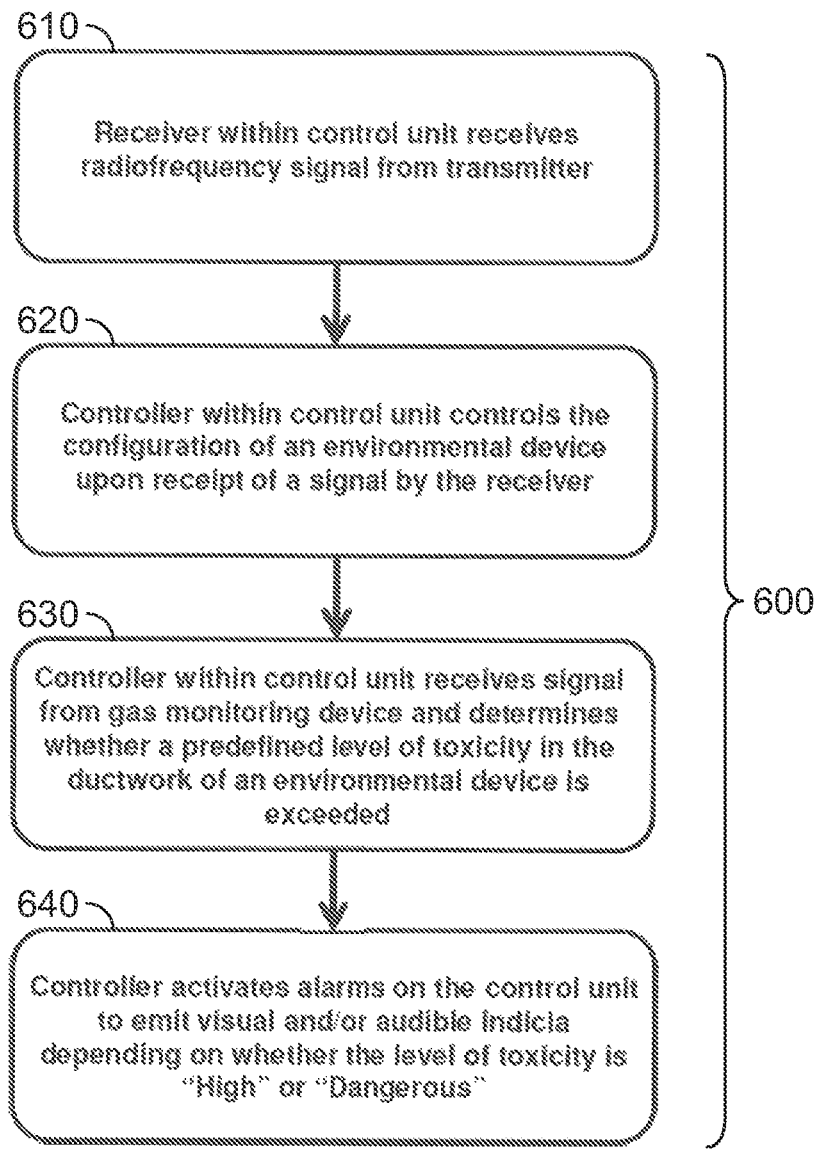
FIG. 9 is a diagrammatic view of a process of controlling an environment within a defined space in accordance with an embodiment of the technology.

As shown in FIG. 9, process 600 for controlling environmental devices is shown. In block 610, a receiver within an environmental control unit receives radiofrequency signal from a transmitter, such as but not limited to transmitting device 100. In an example, the transmitter is electrically connected to a vehicle within an interior compartment of the vehicle, such as but not limited to a cigarette lighter socket of the vehicle, and transmits the signal when the vehicle ignition is running or when the transmitting device is electrically connected to a battery in the vehicle, such as when the vehicle accessory drive is activated by rotating an ignition key. The receiver of the environmental control unit can receive the radiofrequency signal even when the vehicle is more than 150 feet away.

In block 620, a controller, such as but not limited to controller 330, electrically interfacing with the receiver in the control unit, upon receipt of a signal from the receiver via connecting wires, activates the environmental devices in a facility or other defined space and controls their operation based on environmental parameters, including at least one of a power level of any one of the environmental devices, gas concentration, particle concentration, smoke presence, and gas temperature.

In block 630, the controller, receives a signal from a gas monitoring device connected to external gas sensors located remotely from the gas monitoring device and controller, e.g., in the ductwork associated with, i.e., adjacent to, an environmental device, such as an exhaust fan. In an example, the controller determines whether the concentration of a toxic gas exceeds a threshold level of toxicity and activates the fan designated as EF-2. Gases that may be monitored for their levels of toxicity include, but are not limited to, carbon monoxide, nitrogen dioxide, hydrogen sulfide, oxygen, hydrogen, methane and propane.

In block 640, the controller, upon determination that the concentration of a toxic gas exceeds a predefined level of toxicity, activates any of visual and audible indicia on an alarm, such as but not limited to of sensory alarm 224, of the control unit. For example, if the level of toxicity is determined by controller to be at or above a predefined "High" value of toxicity but less than a predefined "Dangerous" value, the controller activates a flashing yellow indicator 224b. On the other hand, if the level of toxicity is determined by the controller to be at the predefined "Dangerous" level, the controller activates both a flashing red indicator light 224a and an audible alarm 224c.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally.

Furthermore, although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. As an example, alternative embodiments of the environmental control system described herein, can be used anytime a transportation vehicle enters a facility or other defined space, such as but not limited to, fire trucks entering fire stations, airplanes entering hangars and submarines entering naval bases.

The invention claimed is:

1. A controller for controlling environmental devices to regulate an air quality within a defined space, comprising:
a microprocessor configured for directing the operation of the environmental devices upon receipt of either one or both of an input from a receiver electrically interfacing with the microprocessor and a signal from a sensor electrically interfacing with the microprocessor;
a plurality of variable resistors electrically interfacing with the microprocessor, wherein each of the resistors are adjustable to set time-periods of function of respective ones of each of the environmental devices; and
a plurality of timers electrically interfacing with the microprocessor and configured for logging and sending the microprocessor runtimes of each of the environmental devices, wherein when the runtime of a first environmental device of the environmental devices is outside a respective preset time period of function for the first environmental device, the microprocessor directs the first environmental device to alter its current configuration in order to regulate the air quality within the defined space.

2. An environmental control system, comprising:
the controller of claim 1; and
at least the respective one of the environmental devices, wherein the environmental devices include any one or any combination of an exhaust fan, a general ventilation fan, and an air cleaning device.

3. An environmental control system, comprising:
the controller of claim 1; and
at least one gas monitoring device electrically interfacing with the microprocessor and configured for receiving electrical signals corresponding to a concentration of a specified gas from gas sensors located remotely from the controller to determine a specified gas concentration wherein when the specified gas concentration is determined by the microprocessor to be outside a predefined range, the controller activates at least one of the environmental devices.

4. The environmental controller system of claim 3, wherein when the concentration of the specified gas exceeds the predefined range, the controller activates at least one of (a) a visual alarm and (b) an audible alarm.

5. An environmental control system, comprising:
the controller of claim 1; and
a temperature sensor electrically interfacing with the microprocessor and configured for detecting temperature within the defined space, wherein when the temperature in the defined space is determined by the microprocessor to be outside a predefined range, the controller activates one of the environmental devices.

6. The environmental control system of claim 2, wherein one of the environmental control devices is the air cleaning device, further comprising a pressure differential switch electrically interfacing with the microprocessor and configured for receiving electrical signals—corresponding to static pressure measured in the air cleaning device to determine the cleanliness of a filter of the air cleaning device, wherein when the cleanliness of the filter is determined by the microprocessor to be outside a predefined range, the controller directs a change of status of a status indicator.

7. The environmental control system of claim 6, wherein the status indicator is a light such that when the cleanliness of the filter of the air cleaning device is determined by the microprocessor to be outside the predefined range, the controller directs the light to be illuminated.

8. An environmental control system, comprising:
the controller of claim 1; and
a smoke detector electrically interfacing with the microprocessor and configured for detecting a concentration of smoke in the air of the defined space, wherein when smoke is detected in the defined space, the controller de-energizes and shuts down all of the environmental devices.

9. An environmental control unit, comprising:
the controller of claim 1; and
a display configured for indicating any one or any combination of an operational status of each of the environmental devices, the runtime of each of the environmental devices, and environmental status information of each of the environmental devices.

10. An environmental control unit, comprising:
the controller of claim 1; and
a display configured for indicating the temperature of exhaust gases in at least a portion of the defined space.

11. An environmental control unit, comprising:
the controller of claim 1; and
a battery backup electrically interfacing with the microprocessor and configured for providing electrical power to the microprocessor in the event of a loss of utility-sourced power.

12. An environmental control unit, comprising:
the controller of claim 1; and
a notification device electrically interfacing with the controller, wherein the controller directs the notification device to send messages to at least one predetermined recipient when the controller determines that environmental parameters are outside a predefined range.

13. The environmental control unit of claim 12, wherein the environmental parameters are selected from the group consisting of a power level of any one of the environmental devices, gas concentration within the defined space, particle concentration within the defined space, smoke presence within the defined space, and gas temperature within the defined space.

14. The environmental control unit of claim 12, further comprising an uninterruptible power supply (UPS), wherein the notification device receives electrical power from the UPS upon the loss of utility-sourced power.

15. An environmental control unit, comprising:
the controller of claim 1; and
a visual alarm electrically interfacing with the controller, wherein the controller directs the visual alarm to emit light when a gas concentration within the defined space is determined by the controller to be outside a predefined range.

16. The environmental control unit of claim 15, wherein the visual alarm is a first color when the gas concentration within the defined space is determined to be within a first range outside the predefined range, and wherein either one or both of (i) the visual alarm is a second color when the gas concentration within the defined space is determined to be within a second range outside both the predefined range and the first range and (ii) the environmental control unit further comprises an audible alarm which emits a sound when the gas concentration within the defined space is determined to be within the second range.

17. An environmental control unit, comprising:
the controller of claim 1; and
an exterior control panel having a plurality of buttons, wherein each of the buttons, when depressed, activates one of the environmental devices.

18. The environmental control unit of claim 17, wherein at least one of the buttons, when depressed, activates one of the environmental devices to run for a predefined time cycle.

19. An environmental control unit, comprising:
the controller of claim 1; and
an alarm horn which emits an audible sound upon loss of electrical power to the environmental control unit.

20. An environmental control unit, comprising:
the controller of claim 1; and
a push-button, wherein when the button is depressed, at least one preset phone number is automatically dialed by environmental control unit.

\* \* \* \* \*